US006384874B1

(12) United States Patent
Ushizaka

(10) Patent No.: US 6,384,874 B1
(45) Date of Patent: May 7, 2002

(54) DISPLAY APPARATUS

(75) Inventor: Yuuichi Ushizaka, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/248,983

(22) Filed: Feb. 12, 1999

(30) Foreign Application Priority Data

Feb. 13, 1998 (JP) .......................................... 10-031485

(51) Int. Cl.[7] .................................................. H04N 5/74
(52) U.S. Cl. ........................................ 348/749; 348/776
(58) Field of Search ................................ 348/744, 748, 348/749, 776, 777, 779, 805; 411/542; 313/35, 45; H04N 9/31, 5/74

(56) References Cited

U.S. PATENT DOCUMENTS 4,777,532 A * 10/1988 Hasegawa ................... 358/231
5,409,337 A * 4/1995 Muyskens et al. .......... 411/148
5,877,583 A * 3/1999 Meglio et al. ................ 313/35

FOREIGN PATENT DOCUMENTS

JP 2-177228 * 7/1990
JP 6-89656 * 3/1994

* cited by examiner

*Primary Examiner*—David E. Harvey
(74) *Attorney, Agent, or Firm*—Ronald P. Kananen, Esq.; Rader, Fishman & Grauer, PLLC

(57) ABSTRACT

The present invention provides a display apparatus for discharging and removing needless cooling liquid consistently when the display apparatus for cooling a cathode ray tube with cooling liquid is fabricated and relates to a display apparatus for cooling cathode ray tubes with cooling liquid is provided with a cooling liquid container for containing cooling liquid for cooling the cathode ray tubes, a sealing member for sealing cooling liquid in the cooling liquid container by plugging a cooling liquid charging hole formed on the cooling liquid container after cooling liquid is charged into the cooling liquid container, and a residual cooling liquid discharging outlet provided with connection to the sealing member and the cooling liquid container for discharging residual cooling liquid in the space between the sealing member and cooling liquid container to the outside though the space between the sealing member and the cooling liquid container.

9 Claims, 11 Drawing Sheets

DISPLAY APPARATUS

BACKGROUND OF THE INVENTION

1. Field of the Invention

This invention relates to an display apparatus for projecting an image displayed on a cathode ray tube, and more particularly relates to improvement of a display apparatus having a structure for cooling a cathode ray tube with cooling liquid.

2. Description of Related Art

Recently, with popularization of multi-media apparatuses and computers, demand for a display apparatus having a large screen has risen increasingly. Various types of television receivers, image monitors, and image projectors which use a cathode ray tube (CRT) have been proposed as display apparatuses for displaying images of this sort. Among these display apparatuses, a type of display apparatus having structure for enlarging an image displayed on a cathode ray tube and displaying the enlarged image on a screen has been known. A display apparatus of this type can project the light of an image onto the front side of the screen or display an enlarged image on the screen by projecting the light of the image from the back side of the screen.

A projection type display apparatus for forming an image by projection is provided with three cathode ray tubes corresponding to a red (R) image, a green (G) image, and a blue (B) image to be projected on the screen side. These images displayed by these cathode ray tubes are subjected to optical processing through lenses and projected on the screen side. Because the respective cathode ray tubes generate heat, the cathode ray tubes should be cooled with cooling liquid. Cooling liquid used for cooling a cathode ray tube is usually a liquid mixture which is non-volatile under a normal temperature containing mainly, for example, ethylereglycol, and such cooling liquid is apt to stay without evaporation.

FIG. 1 shows a conventional projection type display apparatus. This display apparatus has three cathode ray tubes 1000, 1001, and 1002; the respective cathode ray tubes 1000, 1001, and 1002 form images of monochromatic colors namely red (R), green (G), and blue (B), and the respective images are projected on the screen 1004 through lenses 1003 to form a color image on the screen 1004. Cooling mechanisms 1005 for holding cooling liquid are provided between these cathode ray tubes 1000, 1001, and 1002 and corresponding lenses 1003.

FIG. 2 shows a cathode ray tube 1000 (1001, and 1002) and the cooling mechanism 1005. The cooling mechanism 1005 has a metal box 1006, and a metal box 1006 has the structure for containing cooling liquid 1007 in the metal box 1006. Cooling liquid 1007 is charged from a hole 1008, and a sealing screw 1009 is tightened after charging so that the cooling liquid 1007 does not leak through the hole 1008.

FIG. 3 and FIG. 4 show a screw 1009 tightened in the hole 1008 of the metal box 1006. An O-ring 1011 for sealing is provided between the screw 1009 and the groove 1010 of the metal box 1006.

Application of such structure causes problems as described hereafter. In FIG. 2, when cooling liquid 1007 is charged into the metal box 1006 though the hole 1008 and thereafter the screw 1009 is screwed into the hole 1008, as shown in FIG. 4, a part 1007A of the cooling liquid 1007 is confined in a space defined by the groove 1010, the O-ring 1011, and the screw 1009, because cooling liquid remains in the groove 1010 when cooling liquid is charged.

The needless liquid 1007A confined as described herein above leaks slowly with time to the outside from the space defined by the screw 1009, the groove 1010, and the O-ring 1011. Thus cooling liquid 1007A leaks though there is no structural defect and fabrication defect. The cooling liquid which leaks to the outside remains on the metal box 1006 because cooling liquid is non-volatile under a normal temperature.

OBJECT AND SUMMARY OF THE INVENTION

It is an object of the present invention to provide a display apparatus having a structure for discharging and removing needless cooling liquid consistently when a display apparatus having a structure for cooling a cathode ray tube with cooling liquid is fabricated.

The present invention is accomplished by using a display apparatus having a structure for projecting and displaying an image displayed on a cathode ray tube and having a structure for cooling the cathode ray tube with cooling liquid provided with a cooling liquid container for containing cooling liquid for cooling the cathode ray tube, a sealing member for sealing cooling liquid in the cooling liquid container by plugging a cooling liquid charging hole formed on the cooling liquid container after cooling liquid is charged into the cooling liquid container, and a residual cooling liquid discharge outlet provided with connection to the sealing member and the cooling liquid container for discharging residual cooling liquid in the space between the sealing member and the cooling liquid container to the outside through the space between the sealing member and the cooling liquid container.

In the present invention, the cooling liquid container contains cooling liquid used for cooling a cathode ray tube. The sealing member seals cooling liquid in the cooling liquid container by plugging the cooling liquid charging hole formed on the cooling liquid container after charging of cooling liquid into the cooling liquid container. The residual cooling liquid discharging outlet provided with connection to the sealing member and the cooling liquid container functions to discharge and remove residual cooling liquid remaining in the space between the sealing member and the cooling liquid container to the outside though the space between the sealing member and the cooling liquid container. Thereby, residual cooling liquid remaining in the space between the sealing member and the cooling liquid container is discharged to the outside easily through the cooling liquid discharge outlet, the problem of confined cooling liquid is solved, and liquid leakage is eliminated.

DETAILED DESCRIPTION OF THE PREFERRED EMBODIMENTS

Preferred embodiments of the present invention will be described in detail with reference to the drawings.

Because the embodiments described hereinafter are detailed examples of the present invention, though the embodiments are described with various technically preferable restrictions, the scope of the present invention is by no means limited to these embodiment unless otherwise specified to limit the present invention in the description hereinafter.

Figure 1:
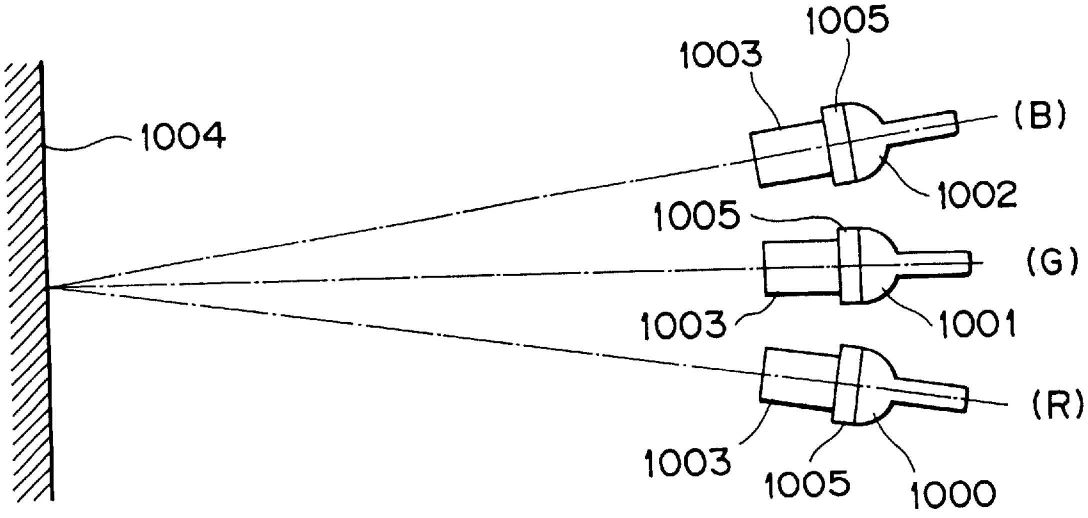
FIG. 1 is a plan view for illustrating a conventional display apparatus.
Figure 2:
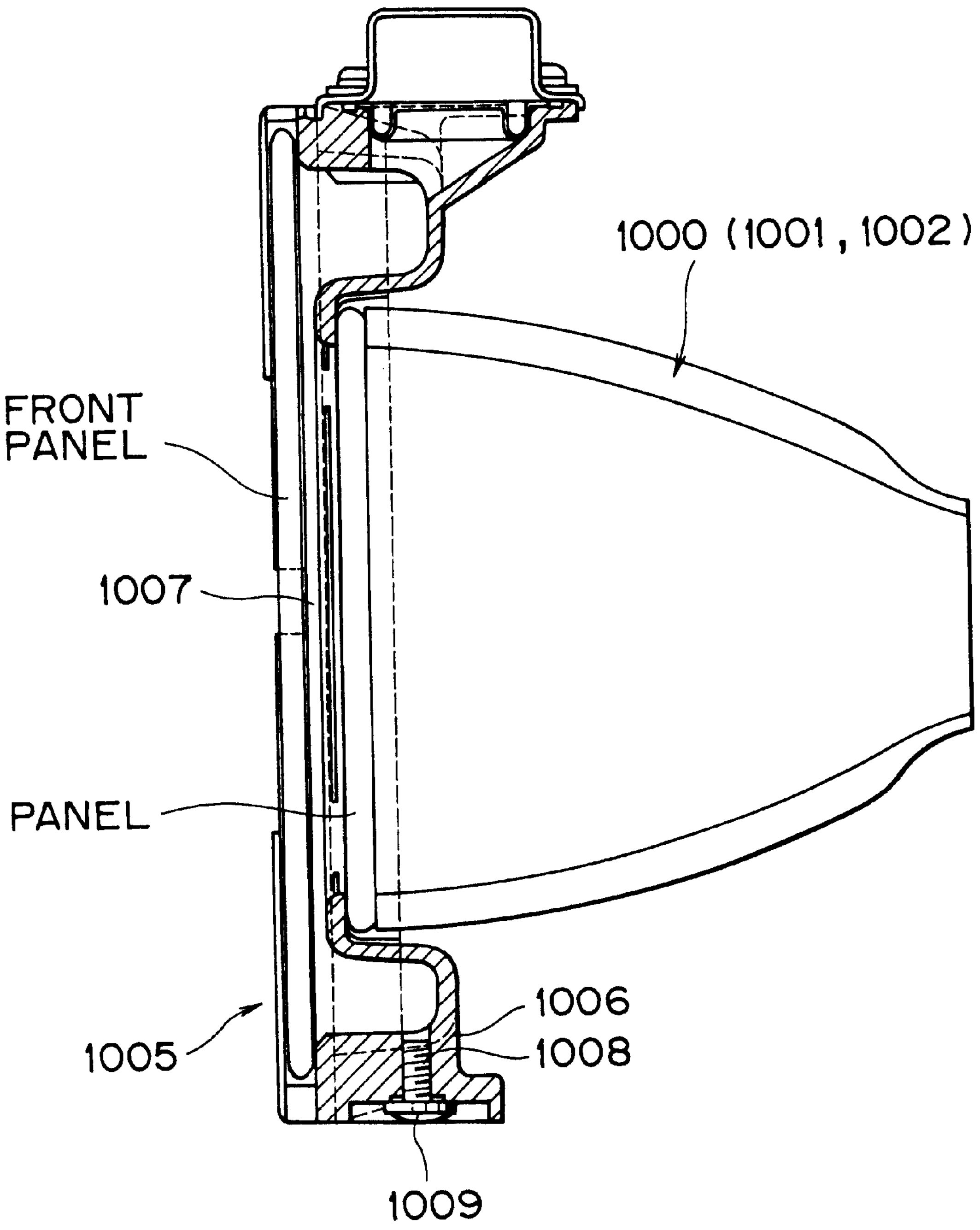
FIG. 2 is a side view for illustrating a cathode ray tube and a metal box for containing cooling liquid of a conventional display apparatus of FIG. 1.
Figure 3:
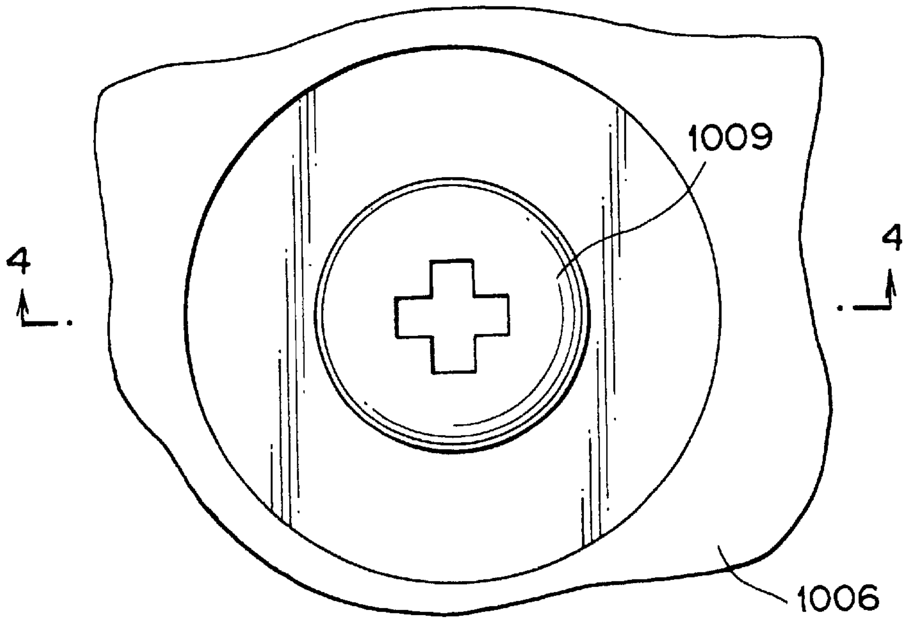
FIG. 3 is a plan view for illustrating a screw attached to the conventional metal box.
Figure 4:
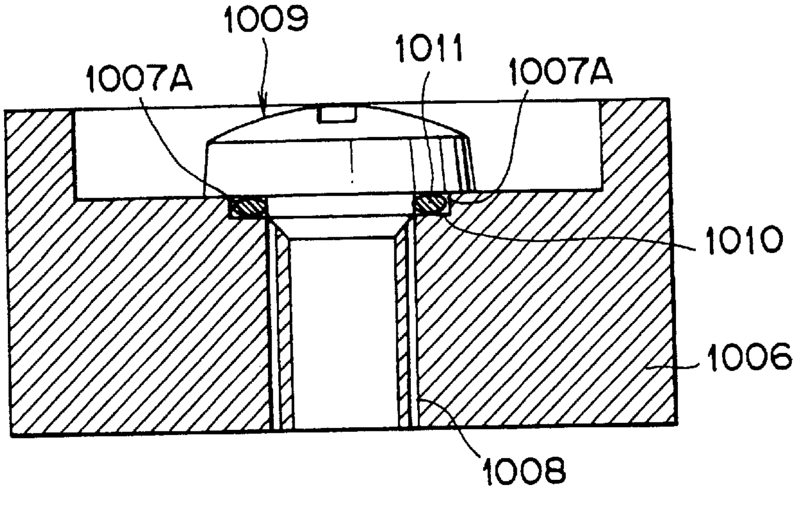
FIG. 4 is a cross sectional view along a, line 4—4, in FIG. 3.
Figure 5:
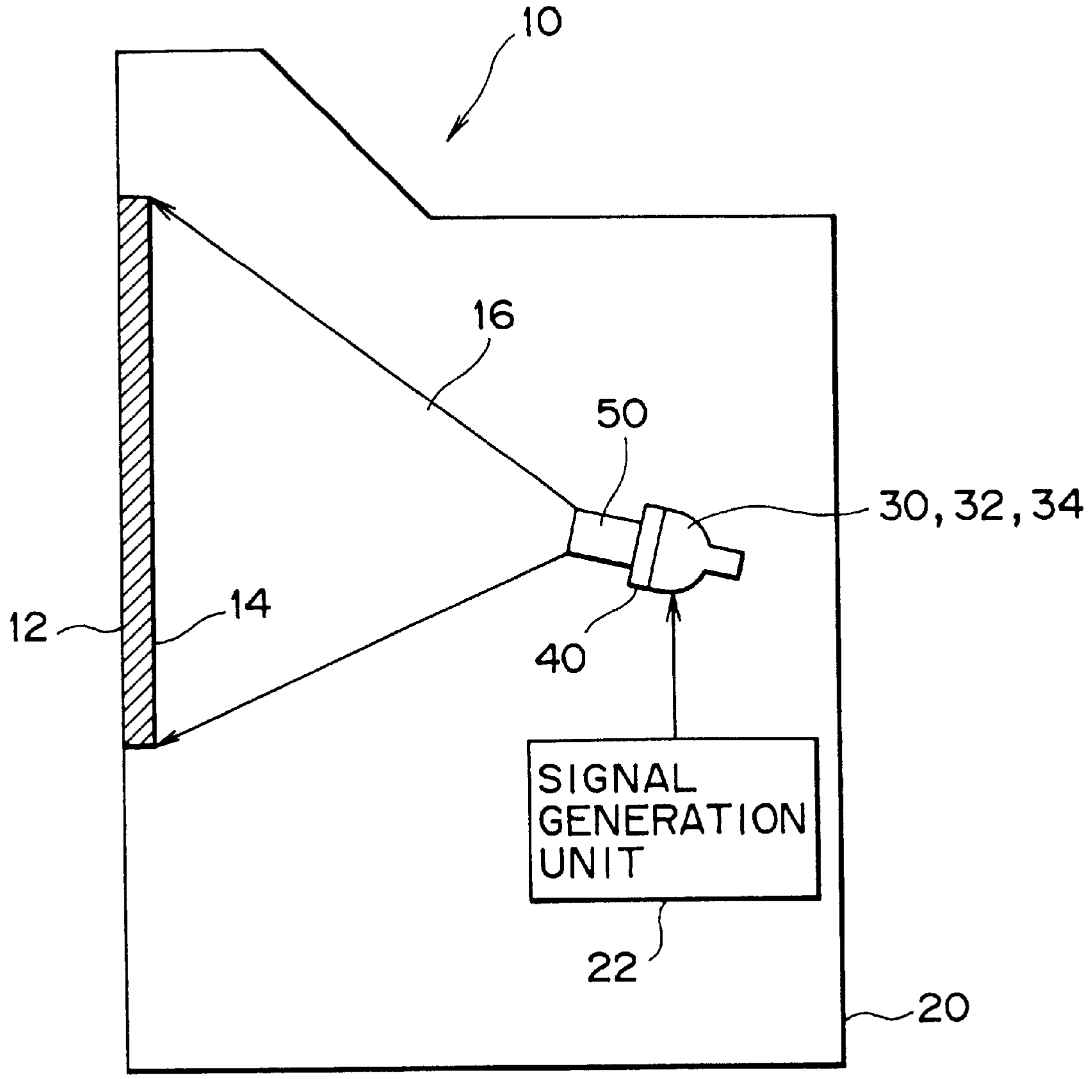
FIG. 5 is a side view of a preferred embodiment of the display apparatus of the present invention.

FIGS. 5 to 12 show a preferred embodiment of the present invention. A display apparatus 10 shown in FIG. 5 is a so-called back projection display apparatus, which projects the projection light 16 of an image to the back side 14 of a screen 12.

The display apparatus 10 is provided with a cabinet 20, a signal generation unit 22 disposed in the cabinet 20, cathode ray tubes (CRT) 30, 32, and 34, a cooling mechanism 40, and the screen 12.

The cathode ray tubes 30, 32, and 34 are cathode ray tubes of the same type, and the cathode ray tube 30 forms a red (R) image, the cathode ray tube 32 forms a green (G) image, and the cathode ray tube 34 forms a blue (B) image. In other words, these cathode ray tubes 30, 32, and 34 form monochromatic images respectively, and form an overlapped color image on the screen 12.

Figure 6:
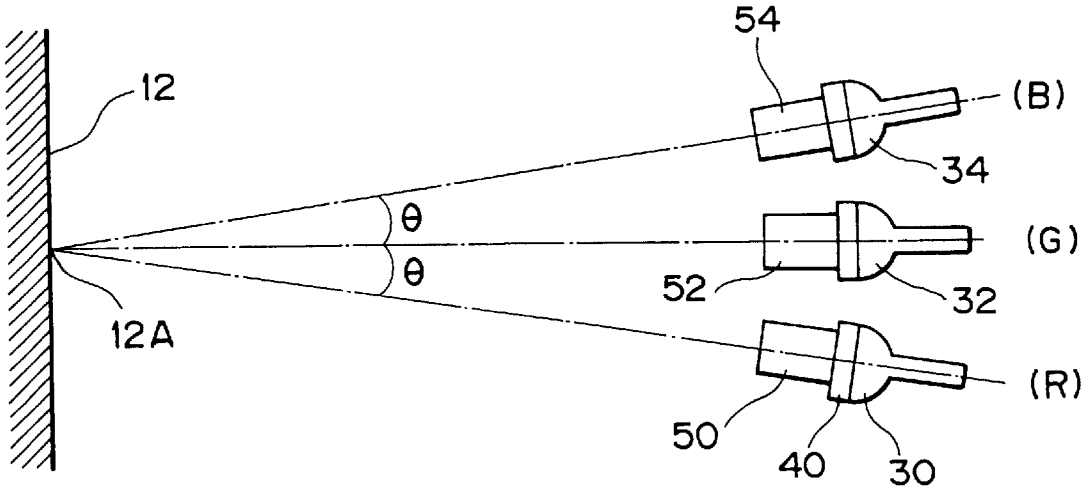
FIG. 6 is a plan view for illustrating cathode ray tubes, a cooling mechanism, a projection lens, and a screen of the display apparatus of the present invention in FIG. 5.

The cooling mechanism 40 in FIG. 6 is provided to cool the cathode ray tubes 30, 32, and 34, and disposed between the cathode ray tubes 30, 32, and 34 and projection lenses 50, 52, and 54.

The projection lenses 50, 52, and 54 shown in FIG. 6 project the respective color images formed by the cathode ray tubes 30, 32, and 34 on an image forming area 12A on the screen 12 to form a color image.

Figure 7:
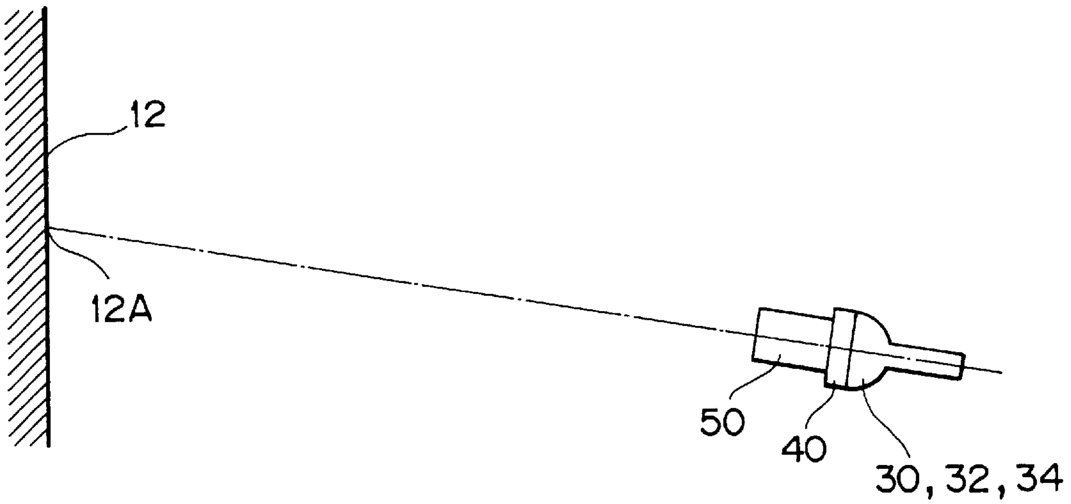
FIG. 7 is a side view for illustrating components of the structure shown in FIG. 6.

In FIG. 6, the cathode ray tube 32 is disposed in the perpendicular direction to the screen 12, and the cathode ray tube 30 and the cathode ray tube 34 are disposed with an inclination angle θ respectively. The cathode ray tubes 30, 32, and 34 are viewed overlapped in the side view as shown in FIG. 7 and FIG. 5, and the cathode ray tubes 30, 32, and 34 are viewed separately with an angle θ in the top view as described herein above as shown in FIG. 6.

Figure 8:
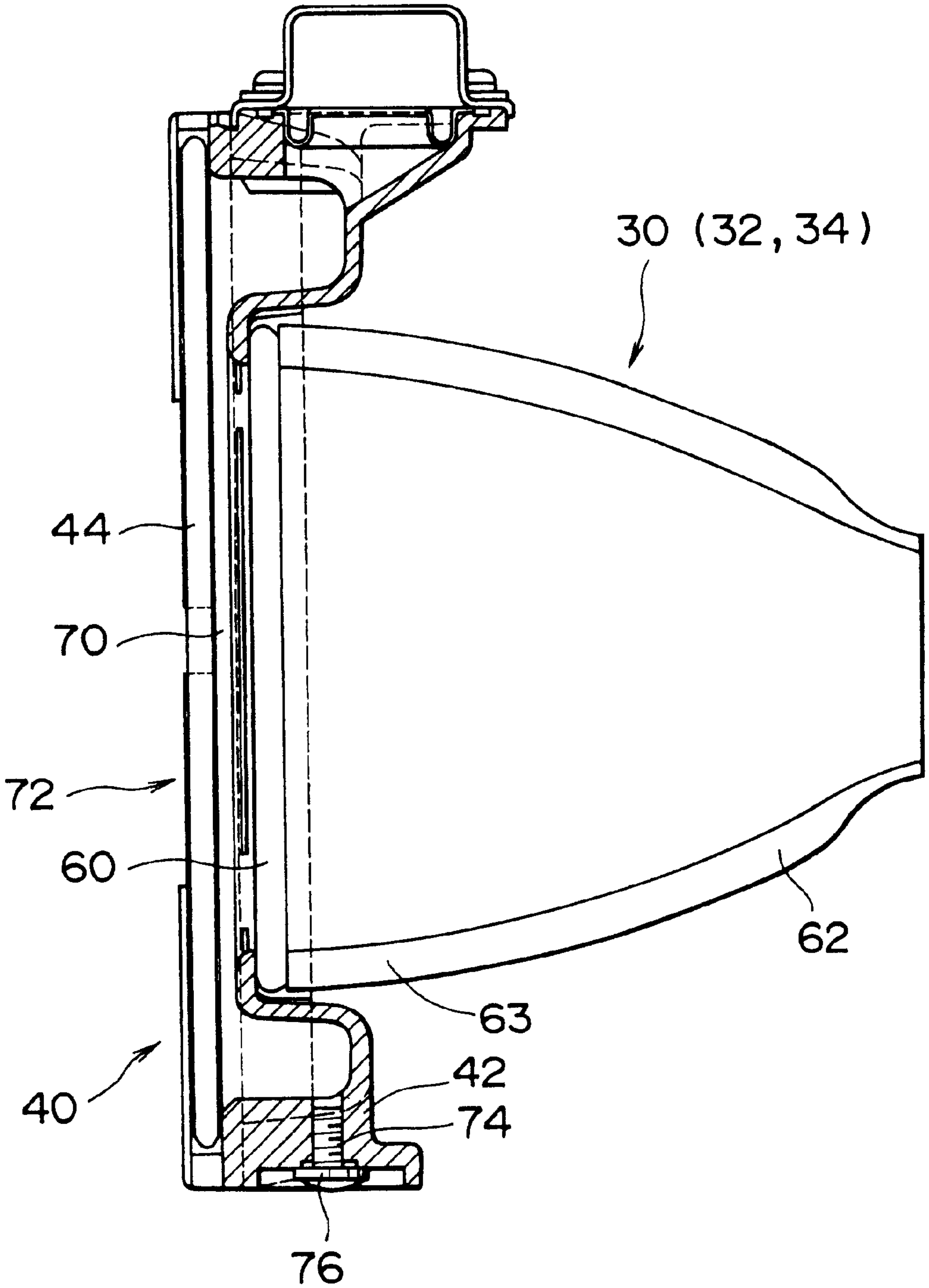
FIG. 8 is a side view for illustrating one cathode ray tube and the cooling mechanism.

FIG. 8 shows the cathode ray tube 30 (32 and 34) in FIG. 6 and one example of a cooling mechanism 40. Because the cathode ray tubes 30, 32, and 34 have the same structure, the structure of the cathode ray tube 30 is described as an example. The cathode ray tube 30 has a panel 60 and funnel 62, and the funnel 62 is provided with an electron gun not shown in the drawing.

Based on a signal supplied from the signal generation unit 22 in FIG. 5, the electron gun forms an image on the panel 60 side in the normal manner.

The cooling mechanism 40 is disposed facing to the panel 60 and the side 63 of the funnel 62. The cooling mechanism 40 is a component for cooling preferably the front face of the cathode ray tube 30, namely the panel 60 and preferably the side 63 of the side member of the cathode ray tube 30, namely the funnel 62. The cooling mechanism 40 has a metal box 42 and a front panel 44, and has a structure having a sealed space for containing cooling liquid 70 between the metal box 42 and the front panel 44, and the front panel 44 and the metal box 42 form a cooling liquid container 72.

For charging cooling liquid into the cooling liquid container 72, cooling liquid is charged from a charging hole 74 formed on the metal box 42. A sealing member 76 is inserted into the charging hole 74 to plug the charging hole after cooling liquid 70 is charged in the cooling liquid container 72 so that the cooling liquid 70 in the cooling liquid container 72 does not leak to the outside.

Figure 9:
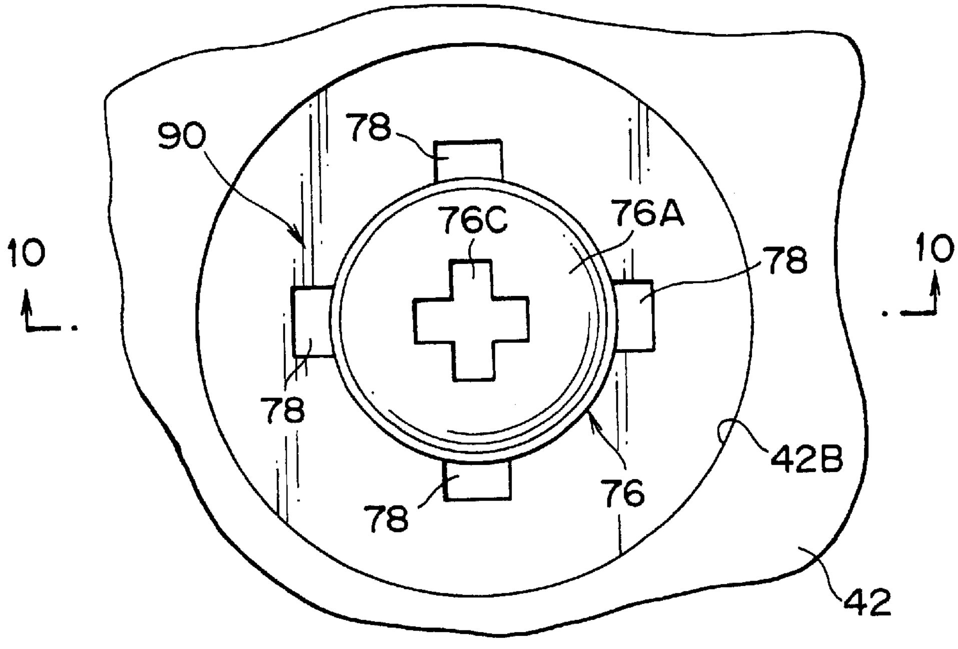
FIG. 9 is a plan view for illustrating a vicinity of an charging hole and a sealing member shown in FIG. 8.
Figure 10:
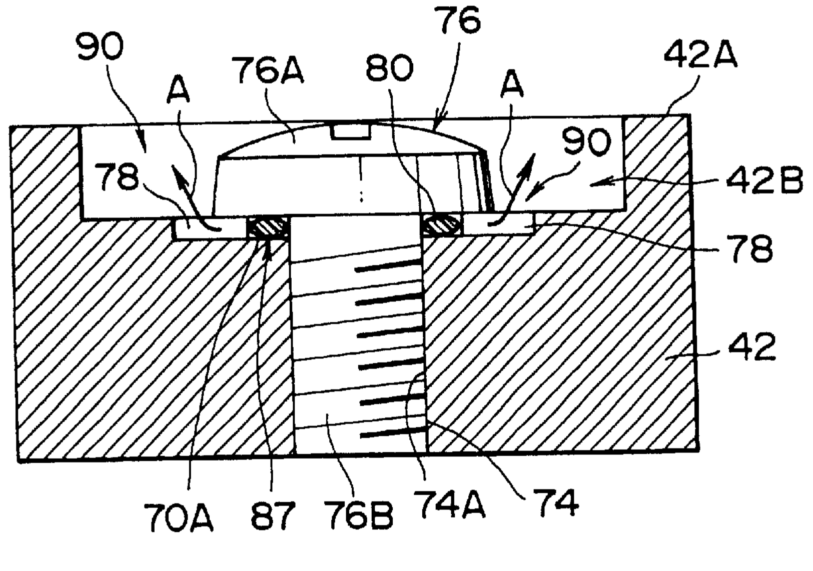
FIG. 10 is a cross sectional view along the line 10—10 in FIG. 9.

The metal box 42 in FIG. 8, the charging hole 74, the sealing member 76, and their vicinities are shown enlarged in FIG. 9 and FIG. 10. On the end 42A of the metal box 42, for example, a circular hole 42B is formed. The size of the hole 42B is larger than the size of the sealing member 76. A plurality of grooves 78 are preferably formed between the hole 42B and the charging hole 74.

Figure 11:
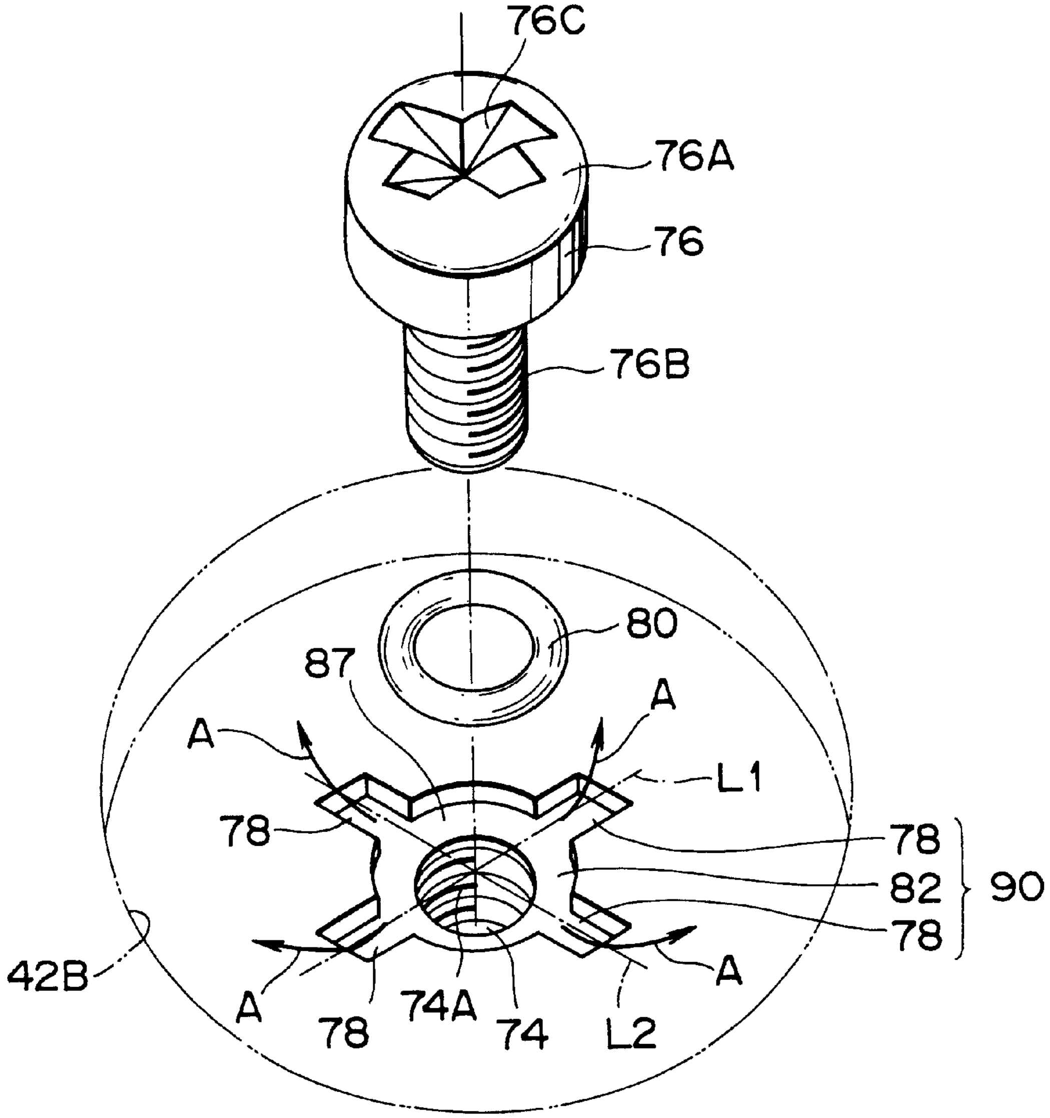
FIG. 11 is an exploded perspective view for illustrating the structure shown in FIG. 9 and FIG. 10.

FIG. 11 shows the grooves 78, the charging hole 74, the sealing member 76, and an O-ring 80.

The grooves 78 comprise four grooves formed, for example, with a 90 degree phase interval, and the grooves 78 are communicated to a circular groove 82 having a size for accepting the head 76A of the sealing member 76. In other words, four grooves 78 extend radially from the circular groove namely ring groove 82, and the grooves 78 and the groove 82 form a residual cooling liquid discharge outlet 90.

The grooves 78 are disposed along two orthogonal straight lines L1 and L2.

On the inside surface of the charging hole 74, a female thread 74A is formed.

The sealing member 76 shown in FIG. 11 has a head 76A and a male thread 76B. On the head 76A, for example, a tool hole 76C for accepting a cruciate tool is formed.

The male thread 76B of the sealing member 76 is screwed into the female thread 74A of the charging hole 74 with interposition of the O-ring 80. Thereby, as in FIG. 10, the O-ring 78 ensures sealing between the bottom of the head 76A of the sealing member 76 and the inside bottom 87 of the metal box 42 so that cooling liquid 70 does not leak from the inside of the metal box 42 shown in FIG. 8 to the outside through the charging hole 74. The O-ring is preferably made of material which maintains its durability and elasticity in the cooling liquid 70.

The residual cooling liquid discharge outlet 90 shown in FIG. 11 is provided to discharge cooling liquid 70A shown in FIG. 10 to the outside easily and consistently. In detail, the residual cooling liquid discharge outlet 90 is structured so that needless cooling liquid 70A which is residual in the space between the bottom of the head 76A of the sealing member 76, the inside bottom 87, and the O-ring 80 is discharged to the outside along the direction of the arrow A shown in FIG. 10.

Next, cooling liquid charging work into the cooling mechanism 40 of the above-mentioned display apparatus 10, removing work of needless cooling liquid 70A, and an exemplary use of the display apparatus 10 shown in FIG. 5 are described. The cooling mechanism 40 shown in FIG. 5 and FIG. 8 is disposed on the panel 60 side of the cathode ray tube 30. Cooling liquid 70 is charged into the cooling liquid container 72 though the charging hole 74 for filling. After the filling, the male thread 76B of the sealing member 76 is screwed into the female thread 74A of the charging hole 74 shown in FIG. 10. In this case, the O-ring 80 is placed between the head 76A and the inside bottom 87. Thereby, the sealing member 76 and the O-ring 80 function to prevent cooling liquid 70 in the cooling liquid container 72 shown in FIG. 8 from leaking through the charging hole 74.

During the charging work described herein above, needless cooling liquid 70A remains on the bottom of the head 76A of the sealing member 76 shown in FIG. 10, near the inside bottom 87, and near the O-ring 80. In the case that ethyleneglycol is used as the cooling liquid 70, the needless cooling liquid 70A is dissolved, for example, in water easily by charging water from the outside. By blowing high pressure air against the mixture of the residual cooling liquid and water, the needless cooling liquid 70A is blown away with water to the outside along the direction of the arrow A.

As described herein above, by providing the plurality of grooves 78 and the groove 82 of the residual cooling liquid discharge outlet 90, needless cooling liquid, which is confined in the inside conventionally, is discharged to the outside completely prior to fabrication work. Therefore, cooling liquid will not leak consistently from the product later.

In the fabricated display apparatus shown in FIG. 5, the cathode ray tubes 30, 32, and 34 project R, G, and B images respectively onto the image forming area 12A of the screen 12 through the lenses 50, 52, and 54 in FIG. 6 when signal image forming signals are transmitted from the signal forming unit 22. Thereby, a dynamic or static color image is formed on the screen 12. In this case, because the panel 60 which is the front side of the cathode ray tubes 30, 32, and 34 shown in FIG. 8 and the side vicinity 63 of the funnel 62 are cooled, the operation of the respective cathode ray tubes 30, 32, and 34 is stabilized, and also heat is prevented from being enclosed in the cabinet shown in FIG. 5.

Figure 12:
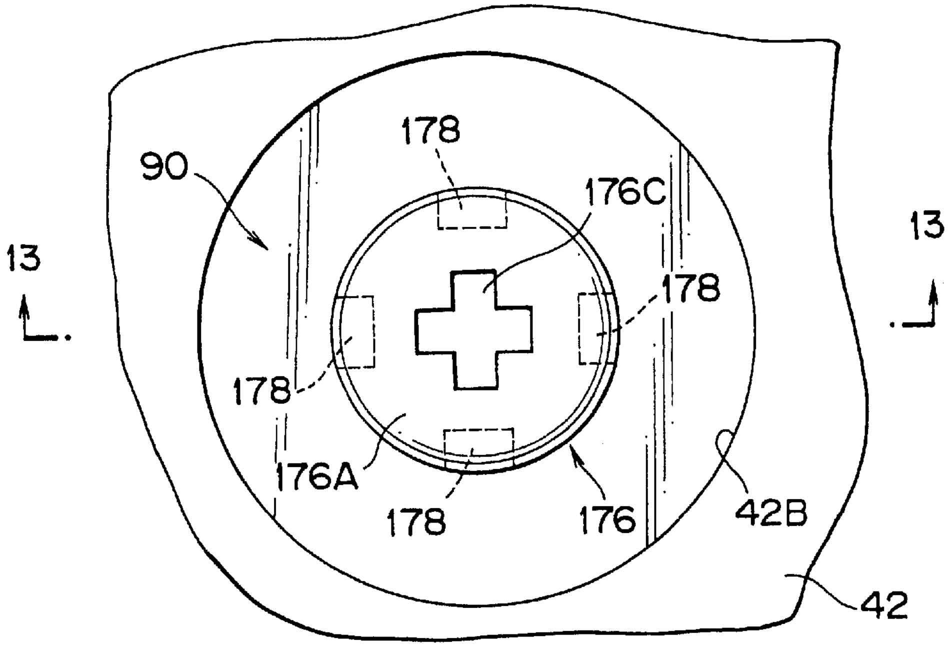
FIG. 12 is a plan view for illustrating the vicinity of a sealing member and a charging hole in another embodiment of the display apparatus of the present invention.
Figure 13:
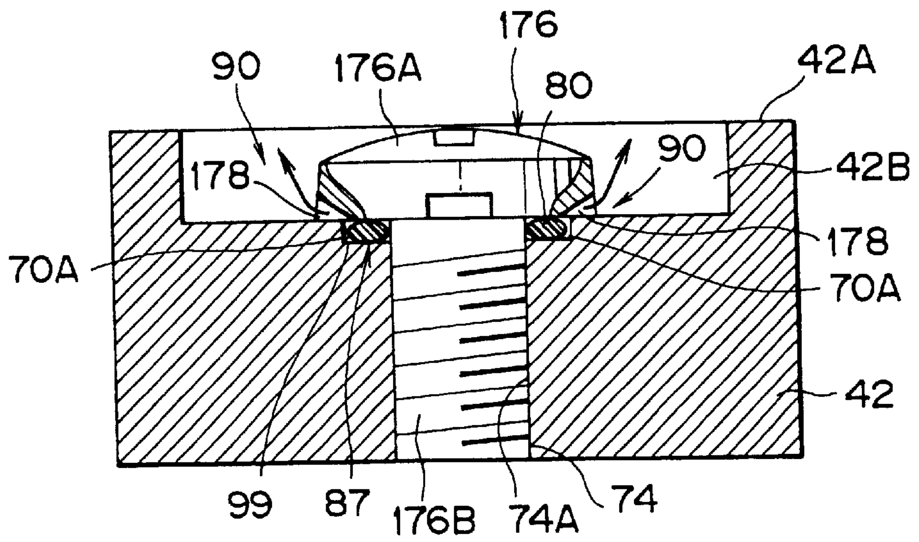
FIG. 13 is a cross sectional view along the line 13—13 in FIG. 12.

Next, FIG. 12 and FIG. 13 show another embodiment of the display apparatus of the present invention wherein, particularly FIG. 12 and FIG. 13 correspond to FIG. 9 and FIG. 10 of the previous embodiment respectively. The same components shown in FIG. 12 and FIG. 13 as those shown in FIG. 9 and FIG. 10 are given the same characters, and the description is omitted.

In the embodiment shown in FIG. 12 and FIG. 13, the shape of the residual cooling liquid discharge outlet 190 is different from the residual cooling liquid discharge outlet 90 shown in FIG. 9 and FIG. 10. In detail, the residual cooling liquid discharge outlet 190 in FIGS. 12 and 13 has grooves 178 formed on the bottom of the head 176A of the sealing member 176. The grooves 178 are components for discharging residual cooling liquid 70A. The needless residual cooling liquid 70A in a space defined by the bottom of the head 176, the O-ring, inside bottom 87, and side 99 is discharged to the outside in the direction of the arrow A or through the plurality of grooves 178 in the same manner as described hereinbefore.

Figure 14:
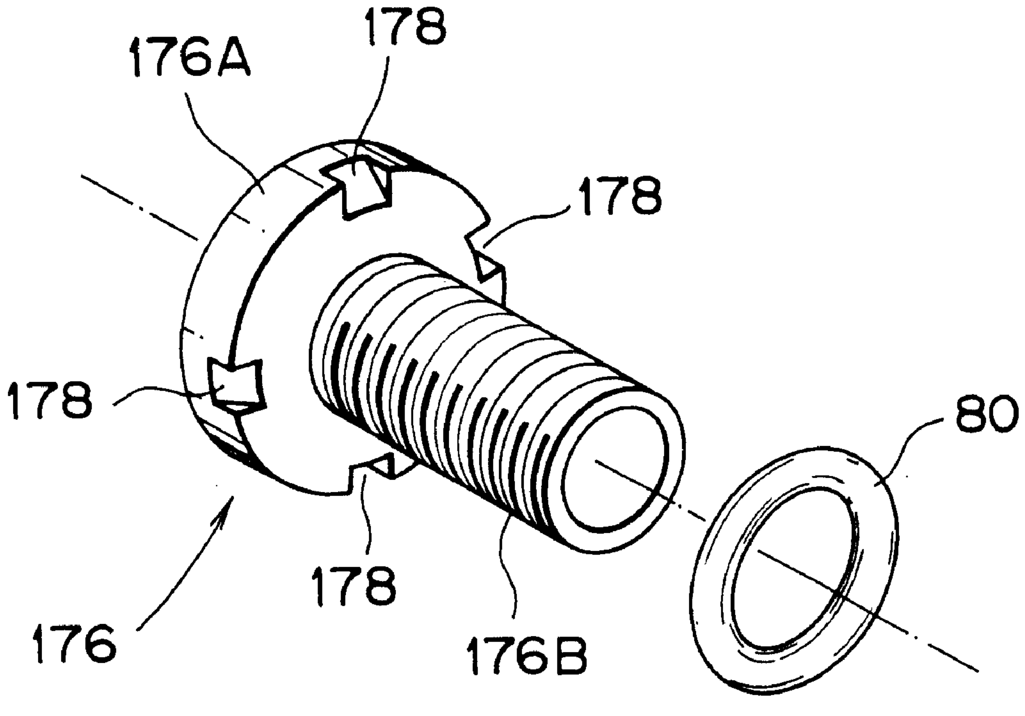
FIG. 14 is a perspective view for illustrating the sealing member and O-ring shown in FIG. 13.

As shown in FIG. 12 and FIG. 14, the grooves 178 are formed radially with a 90 degree interval on the bottom of the head 176A. The head 176A has a tool hole 176C for accepting a cruciate tool.

FIG. 14 shows the sealing member 176 and the O-ring 80. The sealing member 176 has the head 176A and a male thread 176B. The male thread 176B is screwed into the female thread 74A of the charging hole 74 shown in FIG. 13.

Figure 15:
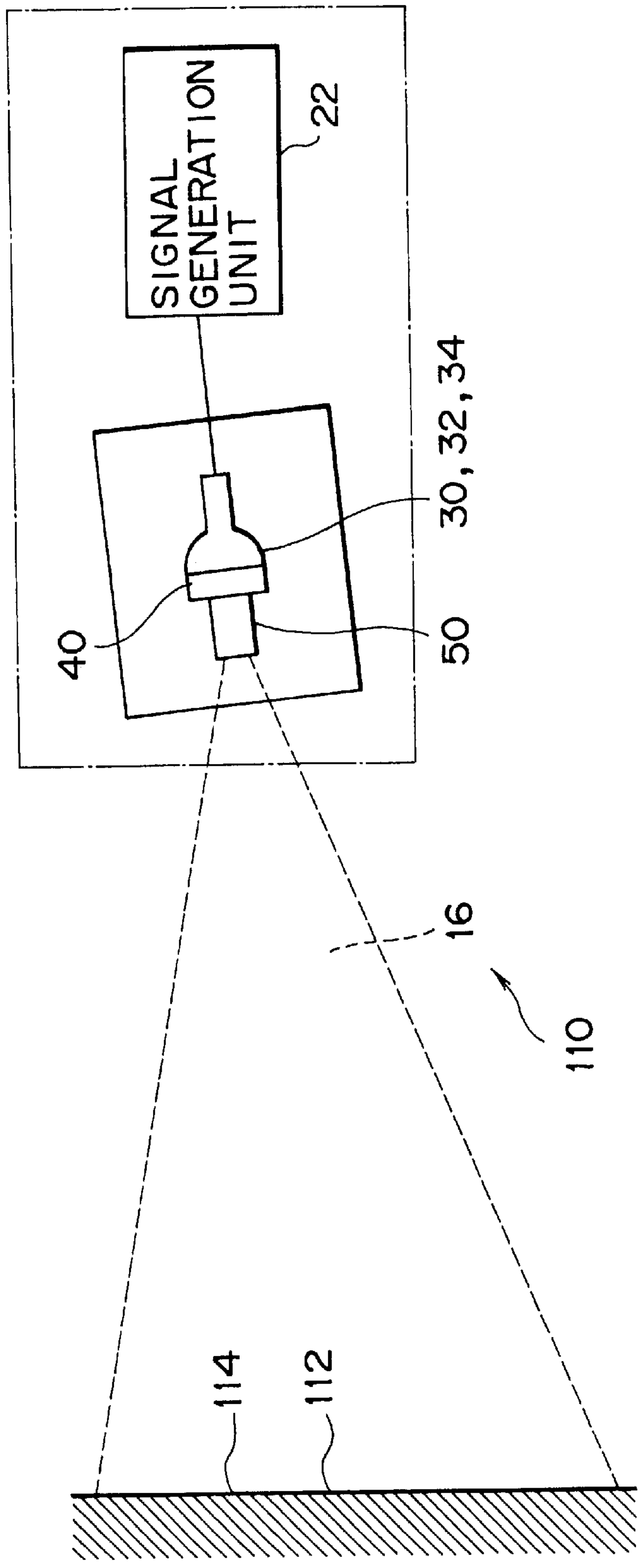
FIG. 15 is a diagram for illustrating another embodiment of the display apparatus of the present invention.

The display apparatus 10 shown in FIG. 5 is a display apparatus of so-called back projection type which projects projection light 16 onto the back side 14 of the screen 12. On the other hand, the display apparatus shown in FIG. 15 is a so-called front face projection type display apparatus 110 which projects projection light 16 of an image onto the front face (front side) of the screen 112. In the display apparatus 110, the cooling mechanism and the sealing member described hereinbefore in the embodiment of the present invention may be used.

The present invention is by no means limited to the above-mentioned embodiments.

In the above-mentioned embodiments, the case that a color image is obtained using arranged three monochromatic cathode ray tubes is described, the present invention is by no means limited to such case. Alternatively, a cathode ray tube which projects R, G, and B color image light onto a screen from a single cathode ray tube may be used. The cooling mechanism can be applied to such cathode ray tube. The thread type sealing member is employed, but the present invention is by no means limited to the type. Alternatively the type in which a sealing member is fitted with a pressure simply, instead of screwing, may be used to prevent cooling liquid from leaking.

What is claimed is:

1. A display apparatus for projecting and displaying an image displayed on a cathode ray tube and for cooling said cathode ray tube with cooling liquid comprising:

a cooling liquid container for containing cooling liquid for cooling said cathode ray tube;

a sealing member for sealing cooling liquid in said cooling liquid container by plugging a cooling liquid charging hole formed on said cooling liquid container after cooling liquid is charged into said cooling liquid container; and a residual cooling liquid discharge outlet provided with connection to said sealing member and said cooling liquid container for discharging residual cooling liquid in a space between said sealing member and said cooling liquid container to the outside through the space between said sealing member and said cooling liquid container.

2. A display apparatus as claimed in claim 1, wherein said residual cooling liquid discharge outlet is a groove formed on said cooling liquid container.

3. A display apparatus as claimed in claim 1, wherein said residual cooling liquid discharge outlet is a groove formed on said sealing member.

4. A display apparatus as claimed in claim 2, wherein said sealing member has a male thread and has a head provided on the end of said male thread, and a female thread for accepting said male thread of said sealing member is formed on said cooling liquid container.

5. A display apparatus as claimed in claim 3, wherein said sealing member has a male thread and has a head provided on the end of said male thread, and a female thread for accepting said male thread of said sealing member is formed on said cooling liquid container.

6. A display apparatus as claimed in claim 1, wherein cooling liquid contained in said cooling liquid container cools the front and side faces of said cathode ray tube.

7. A display apparatus as claimed in claim 1, wherein said display apparatus is provided with the first cathode ray tube for projecting a red image, the second cathode ray tube for projecting a green image, and the third cathode ray tube for projecting a blue image, and images projected by said cathode ray tubes are projected onto a target through projection lenses.

8. A display apparatus as claimed in claim 1, wherein an image projected from a cathode ray tube is projected onto a target on the back side of a screen namely a target.

9. A display apparatus as claimed in claim 1, wherein an image projected from a cathode ray tube is projected onto a target on the front side of a screen namely a target.

* * * * *

UNITED STATES PATENT AND TRADEMARK OFFICE

CERTIFICATE OF CORRECTION

PATENT NO. : 6,384,874 B1
DATED : May 7, 2002
INVENTOR(S) : Yuuichi Ushizaka

It is certified that error appears in the above-identified patent and that said Letters Patent is hereby corrected as shown below:

Column 8,
Line 6, delete "namely a target".
Line 9, delete "namely a target".

Signed and Sealed this

Seventeenth Day of December, 2002

JAMES E. ROGAN
*Director of the United States Patent and Trademark Office*